(12) United States Patent
Yermakov et al.

(10) Patent No.: US 11,005,716 B2
(45) Date of Patent: May 11, 2021

(54) AUTOMATIC CUSTOMER BANDWIDTH UTILIZATION ANALYSIS FOR PROMOTING DYNAMIC CAPACITY

(71) Applicant: Level 3 Communications, LLC, Broomfield, CO (US)

(72) Inventors: Sergey Yermakov, Littleton, CO (US); Pete J. Caputo, II, Highlands Ranch, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 124 days.

(21) Appl. No.: 14/877,294

(22) Filed: Oct. 7, 2015

(65) Prior Publication Data
US 2017/0104634 A1    Apr. 13, 2017

(51) Int. Cl.
*H04L 12/24*    (2006.01)
*H04L 12/26*    (2006.01)

(52) U.S. Cl.
CPC ........ *H04L 41/0896* (2013.01); *H04L 41/142* (2013.01); *H04L 41/16* (2013.01); *H04L 43/0882* (2013.01)

(58) Field of Classification Search
CPC ............. H04L 41/0896; H04L 41/142; H04L 43/0882; H04L 41/16
See application file for complete search history.

(56) References Cited

U.S. PATENT DOCUMENTS

| | | | |
|---|---|---|---|
| 8,589,524 B1* | 11/2013 | Sella | .................... H04L 41/5041 |
| | | | 709/221 |
| 8,953,565 B1 | 2/2015 | Schlesener et al. | |
| 9,159,137 B2* | 10/2015 | Huang | .................. G06T 7/0081 |
| 2002/0152305 A1 | 10/2002 | Jackson et al. | |
| 2005/0141568 A1 | 6/2005 | Kwak et al. | |
| | | (Continued) | |

OTHER PUBLICATIONS

Young-Keun Park and Cyungho Lee, "Applications of neural networks in high-speed communication networks," in IEEE Communications Magazine, vol. 33, No. 10, pp. 68-74, Oct. 1995, doi: 10.1109/35.466222. (Year: 1995).*

(Continued)

*Primary Examiner* — Thinh D Tran

(57) ABSTRACT

A network customer may support a plurality of network connectivity services (such as an E-line). A network connectivity service may experience spikes of traffic, and therefore, spikes of bandwidth usage. Dynamic capacity allows a network connectivity service to increase its available bandwidth during such traffic spikes. A computer-implemented method is disclosed that facilitates identifying network customers that might be interested in purchasing dynamic capacity. The method comprises collecting bandwidth utilization data of network connectivity services supported by each network customer, and identifying those connectivity services that exhibit patterns (e.g., cogent peaks) in their utilization data indicating the network connectivity service is a candidate for dynamic capacity. A trained pattern recognition algorithm is applied on collected utilization data of all network connectivity services and identifies those connectivity services that match the patterns, within a range of tolerance, in their utilization.

14 Claims, 4 Drawing Sheets

(56) References Cited

U.S. PATENT DOCUMENTS

2009/0138420 A1\* 5/2009 Swift .................. H04L 41/147
706/21
2015/0117259 A1 4/2015 Xaypanya et al.

OTHER PUBLICATIONS

S. Wunsch, J. Fink and F. K. Jondral, "Improved Detection by Peak Shape Recognition Using Artificial Neural Networks," Sep. 6-9, 2015 IEEE 82nd Vehicular Technology Conference (VTC2015-Fall), Boston, MA, USA, 2015, pp. 1-5, doi: 10.1109/VTCFall.2015.7390978. (Year: 2015).\*
International Search Report dated Dec. 30, 2016, In'tl Appl. No. PCT/US16/056037, Int'l Filing Date Oct. 7, 2016; 3 pgs.
Written Opinion of the International Searching Authority dated Dec. 30, 2016, In'tl Appl. No. PCT/US16/056037, Int'l Filing Date Oct. 7, 2016; 4 pgs.
Extended European Search Report, dated Feb. 15, 2019, Application No. 16854442.7, filed Oct. 7, 2016; 8 pgs.
International Preliminary Report on Patentability dated Apr. 10, 201, Int'l Appl. No. PCT/US16/056037, Int'l Filing Date Oct. 7, 2016; 6 pgs.

\* cited by examiner

AUTOMATIC CUSTOMER BANDWIDTH UTILIZATION ANALYSIS FOR PROMOTING DYNAMIC CAPACITY

BACKGROUND

Field

This field generally relates to identifying network connectivity services that may benefit from dynamic capacity.

Related Art

Many applications, such as data storage, processing, and presentation applications, utilize a communication network in their operation. The communication network may, for example, provide a network connection that allows data to be transferred between two geographically remote locations. The data may provide, for example, video streaming, voice over IP (VOIP), email, or web services.

The network connection may be provided by a service provider that has a common network it uses to provide service to many different users. A network customer, such as a business enterprise, may order a new network connectivity service, such as a point-to-point Ethernet service or E-Line. Such a request may require a connection that spans multiple links with different available bandwidths. The connection should be set up in a way that meets the Service Level Agreement (SLA) of the user, such as a specific level of bandwidth, latency, or jitter. For example, a business may request an Ethernet e-line connection between two of its locations with a bandwidth of 400 Mbit/second.

Network customers often request a particular service level for a network connectivity service based on how much they plan to use that network connectivity service. But use may vary with time. In one example, a customer may use more bandwidth during the weekends because that is when scheduled backups are scheduled for. In other examples, large ad hoc workloads (e.g., unanticipated multiple video streaming sessions) or even seasonal variations may result in a higher than usual bandwidth utilization.

To allow for varying demand, some service providers allow users to specify for the service level, such as the available bandwidth, of the network connectivity service to vary over time. In some situations, a change in the required service level may be known in advance. For example, an application may utilize a dedicated network connection between two locations at 400 Mbit/s. In addition, the application may have a scheduled backup that occurs between the two locations at a particular time period, such as when backups are scheduled from midnight to 6 am on Sundays. While 400 Mbit/s may be generally sufficient, during the backup, more bandwidth may be required, perhaps double. In one embodiment, a user may schedule an increase in bandwidth for that particular time period. At the start of the time period, the allocated bandwidth doubles to 800 Mbit/s, and, at the end of the time period, the allocated bandwidth returns to 400 Mbit/s.

In other circumstances, the specific change in the required service level may not be known in advance. To deal with these situations, some embodiments dynamically change the service level according to real-time usage of the network service. In these embodiments, a user may set up a business rule that specifies how to change a service level given a particular usage level. For example, a user may set up a business rule that states that allocated bandwidth should be doubled when the bandwidth utilized exceeds a particular threshold. A plurality of these rules may be determined based on the Service Level Agreement (SLA) between the service provider and the user. By dynamically changing bandwidth allocation, users can easily augment their network bandwidth to meet the fluctuating demand of their applications.

This ability to temporarily change the service level, either during a particular time period or when particular conditions are met, may be referred to as dynamic capacity or bandwidth calendaring. While useful, consumers may not be aware of this feature, or that this feature may be useful for their connectivity services. Systems and methods are needed to identify connectivity services that may benefit from this feature.

BRIEF SUMMARY

In an embodiment, a computer-implemented method determines when a network connectivity service is a candidate for dynamic capacity. In the method, data describing utilization of the network connectivity service is received. The data includes a series of data points describing utilization at respective times during a time period. A pattern recognition algorithm is applied to the received data. The pattern recognition algorithm is trained to determine whether a pattern exists in a series of data points indicating the network connectivity service is a candidate for dynamic capacity. When the pattern recognition algorithm indicates that the received data includes the pattern, a message identifying the network connectivity service as a candidate for dynamic capacity is sent.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Figure 1A:
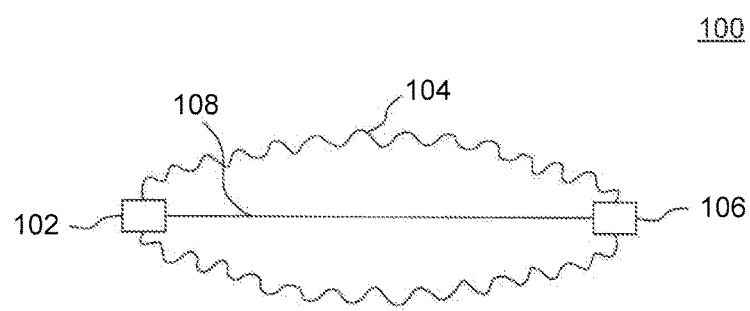
FIG. 1A is a diagram that illustrates a system for providing a network connection to a network customer.

Embodiments identify network connectivity services that may benefit from dynamic capacity. To determine which connectivity services may benefit from dynamic capacity, embodiments analyze utilization records, such as bandwidth utilized that was sampled periodically, using a pattern recognition algorithm. The pattern recognition algorithm is trained to identify utilization patterns that indicate that the connectivity service is a candidate for dynamic capacity.

When a connectivity service is identified as a candidate for dynamic capacity, the customer that uses or requested the connectivity service may be notified. The notification may include a suggestion pertaining to the connectivity services. For example, the suggestion may indicate that during certain hours of the day or certain days of the week, bandwidth utilization of a network connectivity service peaks at levels close to the maximum bandwidth allowed according to the SLA of the connectivity service. Accordingly, the network customer may adopt the suggestion and request dynamic capacity for the network connectivity service.

In an embodiment, pattern recognition technique may be a binary classifier. The binary classifier may classify a connectivity service's bandwidth utilization to one of two classes: (a) not a suitable candidate for dynamic capacity, or (b) a suitable candidate for dynamic capacity. The binary classifier may be implemented using a supervised pattern recognition algorithm such as a neural networks, support vector machine, Bayesian classification, perception, or logistic regression. As mentioned above, the pattern recognition technique may be trained to identify utilization patterns that indicate that the connectivity service is a candidate for dynamic capacity. In a supervised learning algorithm, the learning algorithm is initially trained with labeled data, i.e., data already classified accurately.

In an embodiment, to identify whether a network connectivity service is a candidate for dynamic capacity, a feature vector may be defined based on a sequence of resource utilization readings from the network connectivity service over a specified time period, e.g., readings at five-minute intervals the past week. For example, a first feature vector ray comprise N features: $[u_1, u_2, \ldots u_N]$, where represents the first feature, and is determined by the bandwidth utilization of a network connectivity service at time index 1, $u_2$ is the second feature determined by the bandwidth utilization of the network connectivity service at time index 2, ... and $u_N$ is the $N^{th}$ feature determined by the bandwidth utilization of the connectivity service at time index N.

In an embodiment, a new feature vector is formed every time a new utilization value is obtained, i.e. in a sliding window fashion. For example, if the size of the feature vector is N, once a new utilization value is measured at time index N+1, a new feature vector may be formed comprising a first feature determined by the utilization value at time index 2, followed by a second feature determined by the utilization value at time index 3, and so on, ending with an $N^{th}$ utilization value determined by the utilization value at time index N+1, i.e., $[u_2, u_3, \ldots u_{N+1}]$.

It is often useful to normalize resource utilization readings to a standard range, e.g., 0 to 1, or 0% to 100%. Normalization may allow a single pattern recognition algorithm trained with a single data set to be used for differently sized network connectivity services. For example, to identify whether network connectivity services with a variety of maximum allowable bandwidths (based on their SLAs) are suitable candidates for dynamic capacity using a single trained pattern recognition algorithm, bandwidth utilization data obtained from each network connectivity service may be normalized before it is applied to the pattern recognition algorithm.

Typically, in a binary classification problem entailing hypothesis testing, there are two types of errors: a false positive error and a false negative error. For example, in the classification problem described above, a network connectivity service being a suitable candidate for dynamic capacity is a hypothesis to be tested. Accordingly, if it is falsely indicated that a network connectivity service is a suitable candidate for dynamic capacity (whereas in reality it is not), a false positive error has occurred. Similarly, if it is falsely indicated that a network connectivity service is not a suitable candidate for dynamic capacity, a false negative error has occurred.

There is often a trade-off between false positive errors and false negative errors, particularly when classifying based on a threshold: a lower threshold for positive results yields more false positives but fewer false negatives, and vice versa. In an embodiment, the binary classifier is adjusted such that the probability of false positives, i.e., falsely identifying a network connectivity service as a suitable candidate for dynamic capacity, is minimized, even at the cost of higher false negatives.

As mentioned earlier, if a network connectivity service is determined as a candidate, the network customer that requested the network connectivity service may be notified. For example, the service provider may notify (e.g., via email) a network customer that the bandwidth usage in one of their network connectivity services has been observed to exceed 95% of the maximum bandwidth allowed according to its SLA. In another example, reports on bandwidth utilization of all network connectivity services for all network customers may be periodically, e.g., daily or weekly, posted on a web portal together with suggestions for purchasing dynamic capacity for network connectivity services identified as suitable candidates. In yet another example, an alert system may be made available to network customers, wherein a network customer may be allowed to create alerts that will be activated when the bandwidth utilization of a network connectivity service exhibits a pattern indicative of requiring dynamic capacity.

The Detailed Description that follows is divided into three sections. The first section describes, with respect to FIG. 1A, a network that may include multiple interconnected switching devices, or other network devices, and provide dedicated connections between a network customer and a communication network. The second section describes, with respect to FIGS. 1B, 2, and 3A-B, determining whether a network connectivity service is a candidate for dynamic capacity based on its utilization pattern according to embodiments. The third and final section describes a system which may implement the candidate determination.

Network Utilization

FIG. 1A illustrates a system 100 that provides a communication network 104. The communication network 104 may be a local area network (LAN), metropolitan area network (MAN), or wide area network (WAN). It may utilize any point-to-point or multipoint-to-multipoint networking protocols. The network access protocols used may include, for example, Ethernet, Asynchronous Transfer Mode (ATM), High-Level Data Link Control (HDLC), Frame Relay, Synchronous Optical Networking (SONET)/Synchronous Digital Hierarchy (SDH), or Passive Optical Network (PON).

Still considering FIG. 1A, a system 100 is illustrated that provides a network connectivity service 108 between locations 102 and 106. The locations 102 and 106 are connected to switching devices at the edge of the network. Switching devices may, for example, be access switches that serve as interfaces between end users or routers and network 104. They may be connected by a network of communications links, other switches, and routers. The term "switching device" as used herein refers to both network switches and routers.

Network connectivity service 108 may be a dedicated network connection. A dedicated network connection is a connection with bandwidth reserved for a particular user. In other words, no other user of the network can have access to the bandwidth reserved for a particular user on a dedicated connection. A dedicated network connection can be seen as a private connection for one user. Such a dedicated connection may be point-to-point, in which case the connection connects two points on the network. On the other hand, the connection may also be multipoint-to-multipoint, in which case a set of one or more points on the network is connected to a second set of one or more network points.

In an example, communication network 104 may utilize an Ethernet protocol. In that example, network connectivity service 108 may be an Ethernet E-Line. E-Line is a data service defined by the Metro Ethernet Forum, providing a point-to-point Ethernet connection between a pair of user network interfaces.

The connection provided by network connectivity service 108 may have particular, pre-defined service levels. For example, network connectivity service 108 may transfer data between locations 102 and 106 at a particular bandwidth, latency, or jitter. Bandwidth is the amount of data that a communication line can transfer over a particular time period, often measured in bit-per-second (bps) or multiples of it (for example Mega-bit-per-second or Mbps).

When a network customer requests network connectivity service 108, the resources available on network 104 are evaluated to determine whether links to be assigned to the connection can meet the service level requirement of the connection. For example, the links to be assigned to the connection may be evaluated to determine whether they have available capacity equal or greater than the bandwidth required by the connection.

Determining Candidates for Dynamic Capacity

Figure 1B:
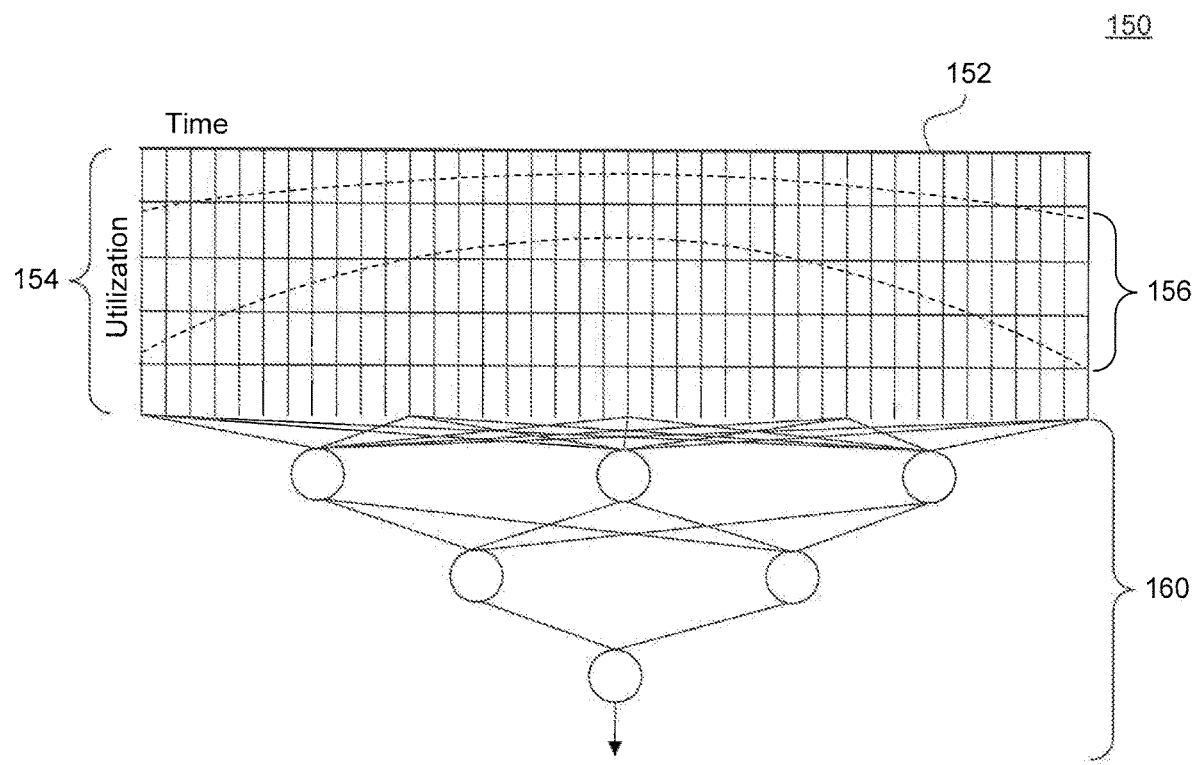
FIG. 1B is a diagram that illustrates a system for determining whether a network connectivity service is a candidate for dynamic capacity.

FIG. 1B shows a diagram 150 that illustrates network resource utilization over a time period for a network connectivity service. Diagram 150 includes a chart with a horizontal axis 152 representing time during a specific time period, such as a day or a week, and a vertical axis 154 representing network resource utilization, e.g., bandwidth utilization, for the network connectivity service.

As illustrated by FIG. 1B, network resource utilization is limited from above by a maximum utilization value dictated by the service level provided to the network customer. In diagram 150, the maximum utilization limit also follows line 152. For example, according to the SLA, a network connectivity service may be allowed a maximum bandwidth of 5 Mbit/second.

A server may collect utilization data, including a series of data points describing utilization at respective times during a time period. For example, the server may collect data on a particular five minute time slice for one week. A skilled artisan would recognize that other intervals and periods may be used.

FIG. 1B also illustrates a pattern recognition mechanism 160 that is applied on the network resource utilization data of a network connectivity service collected over a period of time.

To determine whether a network connectivity service is a candidate for dynamic capacity, pattern recognition mechanism 160 analyzes a series of data points describing the resource utilization of the network connectivity service at respective times during a time period.

In an embodiment, when pattern recognition mechanism 160 determines that a pattern exists in the network resource utilization data of the network connectivity service indicating the network connectivity service is a candidate for dynamic capacity, the network connectivity service is identified as a candidate for dynamic capacity. For example, the pattern may include one or more cogent peaks in the network resource utilization data. Pattern recognition mechanism 160 may be trained to exclude utilization patterns that do not fall within a specific utilization range 156 from being identified as indicative of good candidacy for dynamic capacity. Also, pattern recognition mechanism 160 may be trained to exclude patterns that fall within specific utilization range 156, but do not include the pattern, e.g., do not have a peak, as will be further described with respect to FIG. 2.

Still considering FIG. 1B, a neural network is depicted as an example implementation of a supervised pattern recognition mechanism 160. Neural networks are a family of statistical learning models inspired by biological neural networks, and may be used to estimate functions, generally unknown, that can depend on a large number of inputs. A neural network is generally modeled as a system of interconnected "neurons" or "nodes", such as circular nodes shown in 160, which exchange messages between each other. Neural networks are typically organized in layers. Nodes in different layers of a neural network may be interconnected via edges. Each edge has a numeric weight with which it is associated. Patterns are presented to a neural network via an "input layer" (e.g., the layer comprising three nodes in 160), which communicates to one or more "hidden layers" (e.g., the layer comprising two nodes in 160) wherein the actual processing is performed. The hidden layers are also connected to an output that produces an output value. During the training period of the neural network, the weights are adjusted, thereby making the neural network adaptive to inputs, and capable of learning data patterns.

Figure 2:
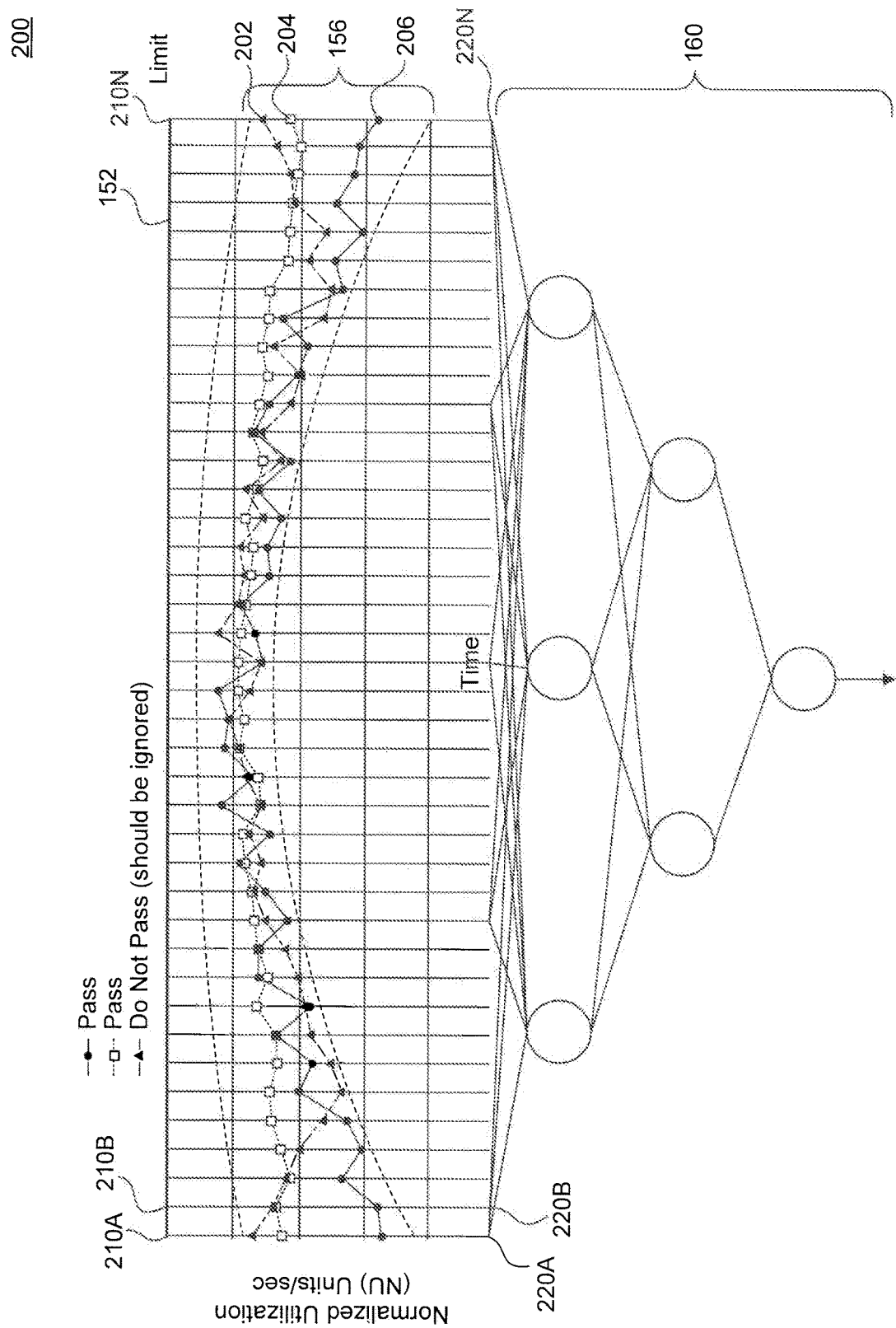
FIG. 2 is a diagram that illustrates example network utilization patterns that are analyzed by a pattern recognition system.

FIG. 2 illustrates example network utilization patterns analyzed by the pattern recognition mechanism 160. As described previously with respect to FIG. 1B, pattern recognition mechanism 160 may be trained to exclude utilization patterns that do not fall within a specific utilization range 156 from being identified as indicative of good candidacy for dynamic capacity. For example, normalized utilization patterns that are below a certain normalized utilization curve, e.g., the lower dotted line defining range 156, may be automatically rejected. This is because, all utility patterns below the lower dotted line in range 156 are indicative of network connectivity services that under-utilize their bandwidth, and as such, are not suitable candidates for dynamic capacity.

In addition, range 156 may also optionally be limited from above by an upper dotted line, which may or may not be distinct from the maximum utilization limit, determined by the SLA. The upper dotted line may be distinct from the utilization limit 152. In one example embodiment, the utilization patterns above the upper dotted line may be automatically identified as requiring additional capacity (not in the form of short term and dynamic capacity), and as such, do not require being analyzed by the pattern recognition mechanism 160 to assess their candidacy for dynamic capacity.

In an embodiment, pattern recognition mechanism 160 may be implemented using a supervised learning algorithm. As mentioned earlier, in a supervised learning algorithm, the learning algorithm is initially trained with labeled data, i.e., data already classified accurately. As mentioned above, neural network 160 may be initially trained with bandwidth utilization data sets. Each data set may be a sequence of bandwidth utilization readings over time for a network connectivity service and may be labeled to identify whether it is a suitable candidate for dynamic capacity. Training neural network 160 will be described in further detail with respect to FIG. 3A.

In an embodiment, to identify whether a network connectivity service may be a good candidate for dynamic capacity, its normalized utilization pattern over a pre-determined time period is used to define a feature vector (as described previously), and is subsequently provided as input to a previously trained pattern recognition mechanism 160. For example, if bandwidth utilization of a network connectivity service is sampled every 5 minute time slice over a one week period. In another embodiment, the sampling may be a moving average of time slices over several weeks. In that example, the feature vector would have an element corresponding to each time slice in the feature vector. Neural network 160 subsequently processes all the input parameters and generates an output, either a "0" or "1" (or either a "−1" or "+1"). For example, an output value of "0" may identify a network connectivity service that is "not a suitable candidate for dynamic capacity" and a value of "1" may identify a network connectivity service that is "suitable candidate for dynamic capacity."

Still considering FIG. 2, three utilization graphs 202, 204 and 206 are illustrated. These graphs are analyzed by a trained neural network 160. Specifically, neural network 160 receives feature vector 220 comprising features [220A . . . 220N] indicating normalized utilization values at times 210A . . . 210N as input. For example, feature vector 220 may be obtained from graph 202, using the sequence of normalized utilization values over discrete time instants 210A . . . 210N, as indicated by the knots on graph 202. Neural network 160 subsequently processes the feature vector and returns at its output one of two possible values (e.g., one of {0,1} or one of {−1,−1}) identifying whether the feature vector is representative of a good candidate for dynamic capacity or not.

In the example embodiment illustrated in FIG. 2, utilization pattern 202 that does not have a peak is determined by trained neural network 160 as not indicative of a good candidate for dynamic capacity. However, utilization patterns 204 and 206 that each have a peak, are determined by trained neural network 160 as indicative of good candidates for dynamic capacity.

Figures 3A, 3B:
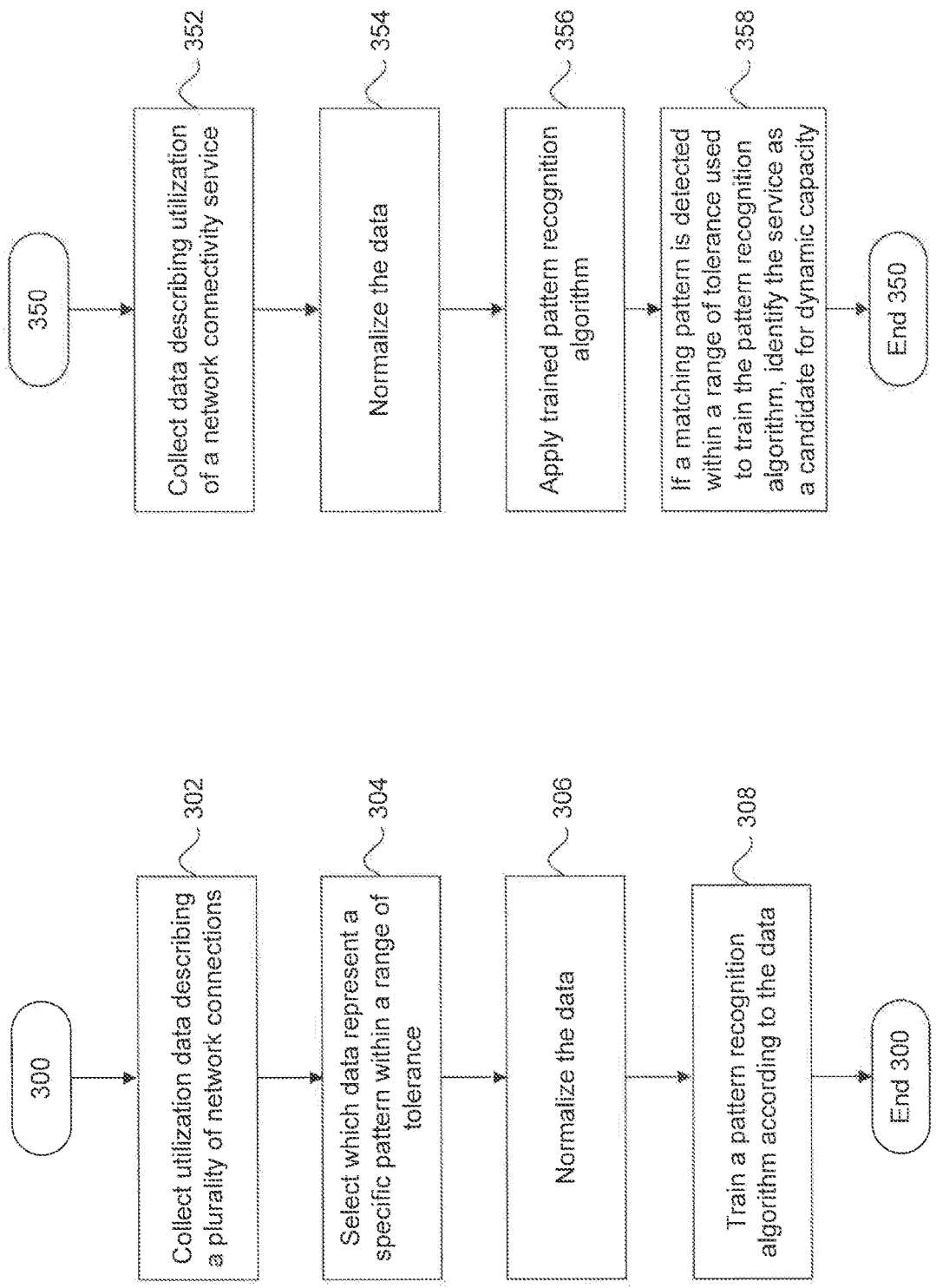
FIG. 3A is a flowchart that illustrates a method for training a pattern recognition system for identifying the network connectivity services that are suitable candidates for dynamic capacity.
FIG. 3B is a flowchart that illustrates a method for determining whether a collected network utilization pattern signifies that a network connectivity service is a suitable dynamic capacity candidate.

FIG. 3A is a flowchart that illustrates a method 300 for training a pattern recognition algorithm to identify network connectivity services that are suitable candidates for dynamic capacity, according to an embodiment of the disclosure. In step 302, utilization data describing a plurality of network connectivity services is collected. As described above, this data is organized in sets of feature vectors, wherein each feature vector corresponds to the resource utilization of a network customer over a period of time, and includes a time-indexed sequence of utilization values.

In step 304, the utilization data collected in step 302 are labeled by an operator, as to determine whether each particular data point (feature vector) is or is not representative of a network connectivity service that is a suitable candidate for dynamic capacity. The utilization data may be labeled as indicative of suitable candidacy for dynamic capacity if they include a pre-determined pattern, within a pre-determined range of tolerance. In an example, data points may be labeled as indicative of suitable candidacy for dynamic capacity if they include a peak. In different embodiments, the peak may be a local or global maxima.

In step 306, the collected utilization data may be normalized to a standard range, e.g., between 0 and 1, or between 0% and 100%.

In step 308, the labeled and normalized data points are used to train the pattern recognition algorithm, such as the neural network 160. For example, a technique such as back propagation may be used to train neural network 160, as it is recognized by a skilled artisan. At the end of this training phase, the pattern recognition algorithm is ready to categorize utilization patterns provided to it as either indicative or not indicative of suitable candidacy for dynamic capacity.

FIG. 3B is a flowchart that illustrates a method 350 for determining whether a network connectivity service is a suitable candidate for dynamic capacity. In step 352, data representing utilization over time for a network connectivity service is collected. In step 354, the utilization data is normalized to a standard range, e.g., 0 to 1, or 0% to 100%.

In step 356, the collected and normalized utilization data is presented to a trained pattern recognition algorithm, e.g., neural network 160. The trained pattern recognition algorithm processes the presented data.

In step 358, the trained pattern recognition algorithm generates an output parameter to indicate whether a network connectivity service is a suitable candidate for dynamic capacity. In an example, if the trained pattern recognition algorithm identifies that the data presented contains a peak, the generated output parameter will indicate that the network connectivity service is a suitable candidate for dynamic capacity.

System

Figure 4:
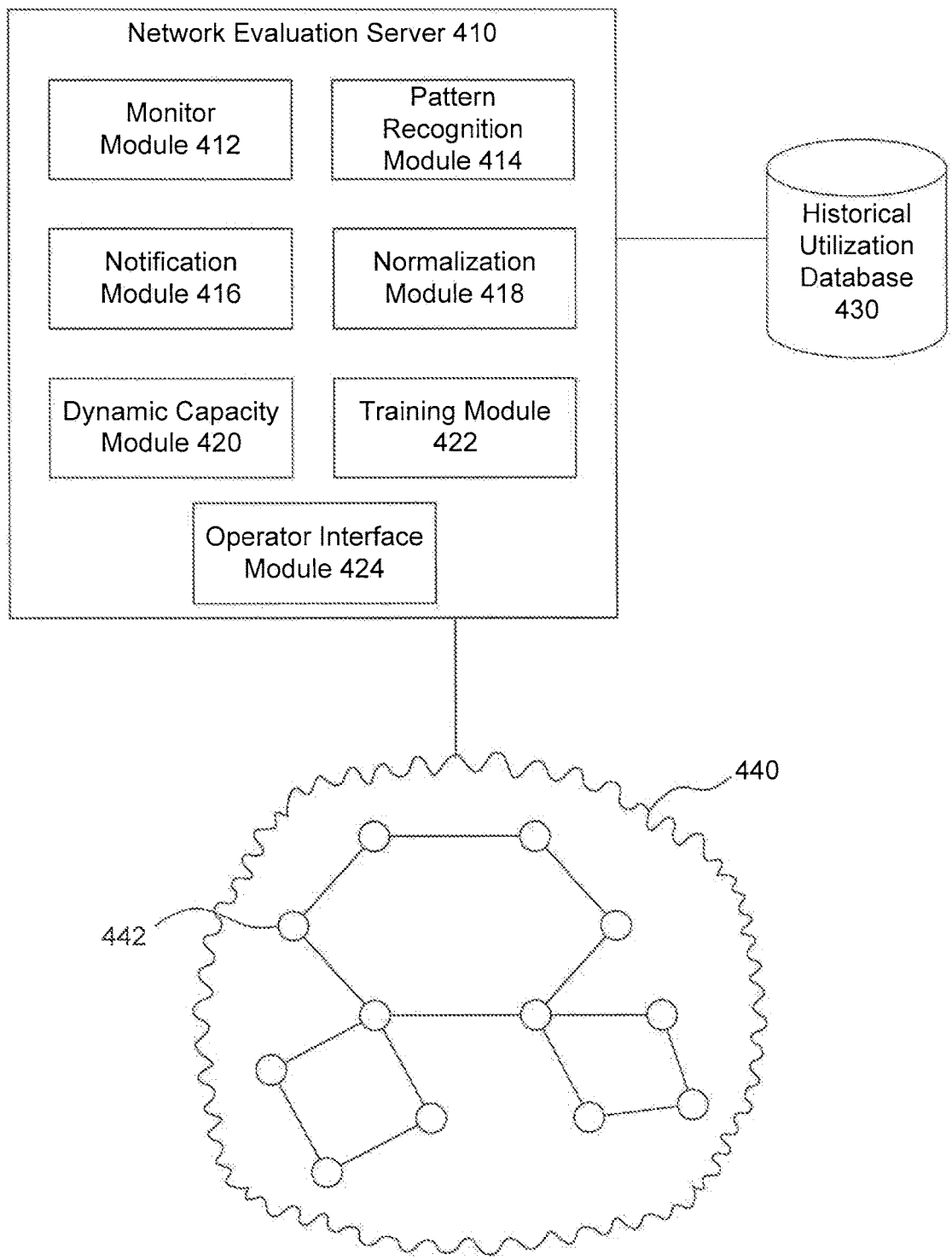
FIG. 4 is a diagram that illustrates a system for monitoring and evaluating the network resource utilization of different network connectivity services.

FIG. 4 illustrates a system 400 for identifying suitable candidates for dynamic capacity, which may operate according to the methods disclosed in FIGS. 3A and 3B. System 400 includes a network evaluation server 410 that is connected to various devices on a network 440 and may gather different types of information. Network 440 may include various switches, such as switch 442.

Network evaluation server 410 may include a variety of modules that will be discussed in turn: a monitor module 412, a pattern recognition module 414, a notification module 416, a normalization module 418, a dynamic capacity module 420, and a historical utilization database 430.

Monitor module 412 records resource utilization of network connectivity services supported on network 440 at different time slices during previous time cycles, as described previously with respect to step 352 in FIG. 3B. The time cycles represent periodic time intervals, and may have a pattern of repeated utilization. The time slices may also represent sub-intervals in the periodic time intervals.

In an embodiment, normalization module 418 may normalize the utilization data collected by monitor module 412, as described previously with respect to step 354 in FIG. 3B.

Training module 422 may use historical utilization data from historical utilization database 430 to train the pattern recognition algorithm in pattern recognition module 414 that is to be applied on collected utilization data of network connectivity services, as previously described with respect to FIG. 3A. Historical utilization database 430 stores a plurality of series of data points, each series corresponding to a different network connectivity service. The data points describe utilization at respective times during a time period for the corresponding network connectivity service. For series of data points, pattern recognition module 414 may receive an indication of whether the series includes a pre-determined pattern form an operator The utilization data may be labeled as indicative of suitable candidacy for dynamic capacity if they include the pre-determined pattern, within a pre-determined range of tolerance. In an example, the pre-determined pattern may comprise one or more peaks. The operator may input the indication using an operator interface module 424, which provides a user interface to prompt the operator for the indication, receives the indication, and provides it to training module 422.

Pattern recognition module 414 applies a trained pattern recognition algorithm on the data collected by monitor module 412. The data provided to pattern recognition module 414 may be previously normalized by normalization module 418. For each data point (feature vector) representing network resource utilization over a pre-determined time period for a network connectivity service, pattern recognition module 414 processes the provided data, and generates a decision as to whether the network connectivity service is a suitable candidate for dynamic capacity.

Dynamic capacity module 420 allocates additional capacity to a network connectivity service utilizing network 440 for a limited period of time when needed. For example, if a particular network connectivity service has a spike in bandwidth usage during the weekends, the pattern recognition module 414 identifies that the particular network connectivity service is a suitable candidate for dynamic capacity. If the network customer supporting this network connectivity service purchases dynamic capacity, additional capacity will be allocated to the connectivity service during the weekends. Different network connectivity services may have spikes of utilization at different times. Therefore, the available dynamic capacity may be allocated dynamically to different connectivity services on a need basis.

To allot a different capacity for a network connectivity service during the specified period, dynamic capacity module 420 may identify a switch or switches in network 440 that provide the services. Each switch may have a policer that caps the bandwidth allowed for the network connectivity service. At the start of the specified period, dynamic capacity module 420 may send messages to each switch to alter the policer to change the bandwidth allowed for the service. And, at the end of the period, dynamic capacity module 420 may send messages to each switch to alter the policer to change the allowed bandwidth back to its original level.

CONCLUSION

A skilled artisan would recognize that in addition to determining the candidacy for purchasing dynamic capacity for a network connectivity service, the systems and methods disclosed herein may be used to determine the necessity of a change in the service level agreement of an existing network connectivity service. For example, the above system and method may be used to identify if a network customer is increasingly experiencing higher bandwidth utilization, and would require a new service level agreement with a higher available bandwidth, if the pattern recognition system is trained appropriately.

Each of the servers and modules in FIG. 4 may be implemented in hardware, software, firmware, or any combination thereof.

Each of the servers and modules in FIG. 4 may be implemented on the same or different computing devices.

Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for determining when a network connectivity service is a candidate for dynamic capacity, comprising:

(a) receiving data describing utilization of the network connectivity service, the data including a series of data points describing utilization at respective times during a time period;

(b) normalizing the received data according to an amount of usage allowed for the network connectivity service, (c) applying a pattern recognition algorithm to the normalized received data, the pattern recognition algorithm trained to determine whether a pattern exists that indicates the network connectivity service is a candidate for dynamic capacity, wherein the pattern recognition algorithm comprises a plurality of input nodes and an output node, the pattern comprises a peak, and the applying comprises:

(i) providing the series of data points describing utilization at respective times during the time period to the plurality input nodes, and (ii) indicating, by the output node, the pattern exists over the time period of the series of data points;

(d) when the pattern recognition algorithm indicates that the received data includes the pattern, sending a message identifying the network connectivity service as a candidate for dynamic capacity;

(e) receiving a plurality of series of data points, each series corresponding to a different network connectivity service, wherein the data points describe utilization at respective times during a time period for the corresponding network connectivity service;

(f) for each of the plurality of series of data points, receiving an indication whether the series includes a peak; and (g) using the received plurality of series and the received indications, training the pattern recognition algorithm to determine whether a peak exists in a series of data points.

2. The method of claim 1, wherein the receiving (a) comprises collecting data from a network device used to provide the network connectivity service.

3. The method of claim 1, wherein the sending the message (d) comprises sending the message to a customer utilizing the network connectivity service.

4. The method of claim 1, further comprising:

(h) receiving another data set describing utilization of the network connectivity service, the data set including a series of data points describing utilization at respective times during a different time period;

(i) applying the pattern recognition algorithm to the received other data set; and (j) when the pattern recognition algorithm indicates that the received other data set includes a peak, sending a message identifying the network connectivity service as a candidate for dynamic capacity.

5. The method of claim 4, wherein the series of data points comprise at least a first data point indexed at a first time point and a second data point indexed at a second time point, the first data point leading the series of data points in time and the second data point immediately following the first data point in time, and wherein the receiving (d) comprises receiving the another data set in a sliding window fashion, the another data set comprising at least a third data point indexed at the second time point, the third data point leading the another data set in time.

6. The method of claim 1, wherein the providing (i) comprises providing the series of data points describing utilization at respective times during the time period to each of the plurality input nodes.

7. The method of claim 1, wherein the providing (i) comprises:

filtering the series of data points to exclude data points outside a utilization range; and providing the filtered series of data points to the plurality input nodes.

8. A program storage device tangibly embodying a program of instructions executable by at least one machine to perform a method for determining when a network connectivity service is a candidate for dynamic capacity, comprising:

(a) receiving data describing utilization of the network connectivity service, the data including a series of data points describing utilization at respective times during a time period;

(b) normalizing the received data according to an amount of usage allowed for the network connectivity service, (c) applying a pattern recognition algorithm to the normalized received data, the pattern recognition algorithm trained to determine whether a pattern exists that indicates the network connectivity service is a candidate for dynamic capacity, wherein the pattern recognition algorithm comprises a plurality of input nodes and an output node, the pattern comprises a peak, and the applying comprises:

(i) providing the series of data points describing utilization at respective times during the time period to the plurality input nodes, and (ii) indicating, by the output node, the pattern exists over the time period of the series of data points;

(d) when the pattern recognition algorithm indicates that the received data includes the pattern, sending a message identifying the network connectivity service as a candidate for dynamic capacity;

(e) receiving a plurality of series of data points, each series corresponding to a different network connectivity service, wherein the data points describe utilization at respective times during a time period for the corresponding network connectivity service;

(f) for each of the plurality of series of data points, receiving an indication whether the series includes a peak; and (g) using the received plurality of series and the received indications, training the pattern recognition algorithm to determine whether a peak exists in a series of data points.

9. The program storage device of claim 8, wherein the receiving (a) comprises collecting data from a network device used to provide the network connectivity service.

10. The program storage device of claim 8, wherein the sending the message (d) comprises sending the message to a customer utilizing the network connectivity service.

11. The program storage device of claim 8, the method further comprising:

(h) receiving another data set describing utilization of the network connectivity service, the data set including a series of data points describing utilization at respective times during a different time period;

(i) applying the pattern recognition algorithm to the received other data set; and (j) when the pattern recognition algorithm indicates that the received other data set includes a peak, sending a message identifying the network connectivity service as a candidate for dynamic capacity.

12. A system for determining when a network connectivity service is a candidate for dynamic capacity, comprising:

a processor and a memory coupled to the processor, the processor configured to:

receive data describing utilization of the network connectivity service, the data including a series of data points describing utilization at respective times during a time period;

normalize the received data according to an amount of usage allowed for the network connectivity service;

apply a pattern recognition algorithm to the normalized received data, the pattern recognition algorithm trained to determine whether a pattern exists that indicates the network connectivity service is a candidate for dynamic capacity, wherein the pattern recognition algorithm comprises a plurality of input nodes and an output node, the pattern comprises a peak, and the processor is configured to apply the pattern recognition algorithm by:
  providing the series of data points describing utilization at respective times during the time period to the plurality input nodes, and
  indicating, by the output node, the pattern exists over the time period of the series of data points; and
when the pattern recognition algorithm indicates that the received data includes the pattern, send a message identifying the network connectivity service as a candidate for dynamic capacity; and
a historical database that stores a plurality of series of data points, each series corresponding to a different network connectivity service, wherein the data points describe utilization at respective times during a time period for the corresponding network connectivity service, the processor further configured to:
  for each of the plurality of series of data points, receive an indication whether the series includes a peak; and
  using the received plurality of series and the received indications, train the pattern recognition algorithm to determine whether a peak exists in a series of data points.

13. The system of claim 12, the processor configured to collect data from a network device used to provide the network connectivity service.

14. The system of claim 12, the processor configured to:
receive another data set describing utilization of the network connectivity service, the data set including a series of data points describing utilization at respective times during a different time period;
apply the pattern recognition algorithm to the received other data set; and
when the pattern recognition algorithm indicates that the received other data set includes a peak, send a message identifying the network connectivity service as a candidate for dynamic capacity.

* * * * *